United States Patent [19]

Mosier

[11] Patent Number: 4,515,440
[45] Date of Patent: May 7, 1985

[54] MOUNTING STRUCTURE FOR MULTIPLE LIQUID CRYSTAL DISPLAYS

[75] Inventor: Donald E. Mosier, Cedar Rapids, Iowa

[73] Assignee: Rockwell International Corporation, El Segundo, Calif.

[21] Appl. No.: 489,652

[22] Filed: Apr. 28, 1983

[51] Int. Cl.³ .................................................. G02F 1/13
[52] U.S. Cl. .................. 350/334; 350/331 R; 350/339 R
[58] Field of Search .............. 350/331 R, 334, 339 R; 368/242

[56] References Cited

U.S. PATENT DOCUMENTS 4,165,607  8/1979  Fedorowicz et al. ................. 368/88
4,236,240  11/1980  Yoshida ....................... 350/331 R X
4,367,467  1/1983  Emile, Jr. ......................... 350/339 R Primary Examiner—John K. Corbin
Assistant Examiner—Richard F. Gallivan
Attorney, Agent, or Firm—Robert C. Mayes; George A. Montanye; H. Fredrick Hamann

[57] ABSTRACT

A structure is disclosed wherein several liquid crystal displays are mounted in close proximity to one another without limiting viewing angle. The displays are mounted in a housing with elastomeric connectors and then covered with a mask, which extends over the gap between the displays. The mask is then covered by a glass member, which is held in place on the mask and the liquid crystal display assembly to compress the elastomeric connectors and insure good electrical contact. The resulting display resembles a single large liquid crystal with no degradation of viewing angle.

3 Claims, 2 Drawing Figures

MOUNTING STRUCTURE FOR MULTIPLE LIQUID CRYSTAL DISPLAYS

BACKGROUND OF THE INVENTION

This invention relates to electronics in general and more particularly to liquid crystal displays.

The use of liquid crystal displays has achieved widespread acceptance in a variety of applications. Large numbers of commercially available liquid crystal displays can be purchased with standard sevensegment displays having two, four or more numerals therein, as well as other liquid displays for showing standard analog representations, for example bar graphs. The use of multiple displays on a single crystal however usually will require a customized display and therefore the cost for custom layout and tooling work is prohibitive for short run production items having relatively severe cost restrictions.

In many typical applications, tne liquid crystal display is electrically interconnected to a parallel mounted printed circuit board utilizing elastomeric connectors of the proper dimensions, wherein each connector has a number of striated conduction zones such that the liquid crystal display having electrical contacts deposited on the back surface of the crystal is pressed firmly against the elastomeric connector which in turn is held against the printed circuit board. The printed circuit board additionally has coincident electrical contacts thereon and if the pressure holding the liquid crystal display is sufficient, good electrical contact is made to each of the contacts without interference from the others and furthermore the elastomeric connector provides a limited degree of shock protection for the crystal and is therefore a preferred method of assemblying and mounting liquid crystal displays.

Typically a structure housing two or more liquid crystals will utilize a bezel formed facing providing sufficient strength to compress the viewing surfaces of the crystals over the electrical contact regions. The strength required of these bezel structures also mandates a substantial thickness in the bezel itself. This necessary thickness results in a restricted viewing angle since the bezels protrude from the viewing surface of the display. A cover glass utilized to clamp the crystals in place will necessarily have its clamping force applied to the entire surface of the displays, and therefore must be relatively thick to provide sufficient force to provide a good electrical contact.

One problem which has been noted when multiple crystals are mounted in the same display is the tendency for the cover glass to deform outwardly away from the crystals in those regions of the display which are a relatively large distance from the edge and therefore not in proximity to the window clamping or supporting apparatus. This problem results in a tendency to make poor electrical contacts to those portions of liquid crystals near the center of a multiple crystal display.

SUMMARY AND BRIEF DESCRIPTION OF THE INVENTION

Accordingly, it is an object of the present invention to provide an improved mounting structure for multiple liquid crystal displays.

Another object of the present invention is to provide a mounting structure for multiple liquid crystal displays having improved electrical contacts.

A yet further object of the present invention is to provide a mounting structure for multiple liquid crystal displays having good electrical contact using elastomeric connectors without significantly reducing the viewing angle.

Briefly, and in accordance with the present invention, a mask for a liquid crystal display having a plurality of crystals each having a viewing surface with annunciator regions thereon, and the crystals are disposed in a proximal coplanar array wherein the mask comprises a planar formed material for contacting portions of the viewing surface of each of the plurality of crystals, has a substantially opaque characteristic, and has voided regions in the material corresponding to the annunciator regions of the crystals. In this manner the mask provides for an increased thickness between the cover window and the crystals and improves the pressure characteristic required when using elastomeric connectors and thereby improves electrical contacts to the liquid crystal displays.

The mask above is positioned on a surface of the liquid crystal opposite the electrical contact region of the liquid crystal displays and is placed directly on the viewing surface in those edge regions of the crystal not used for annunciation.

The liquid crystal display apparatus utilizing the present invention comprises a plurality of liquid crystal displays disposed in a proximal coplanar configuration, each display having an annunciator region on a viewing surface thereof and a plurality of electrical contacts on a surface opposite the viewing surface; a mask in contact with the viewing surfaces in regions opposite the electrical contacts and voided in regions corresponding to the annunciator regions; a printed circuit board providing structural support for the apparatus and electrical communication thereto disposed in a parallel relationship with the crystals; a plurality of elastomeric connectors intermediate the printed circuit board and crystals providing electrical contact therebetween; and a cover window in contact with the mask on a surface thereof opposite the crystals and further having securing means for rigidly attaching the crystals, elastomeric connectors, and mask to the printed circuit board.

In alternative embodiments the above apparatus further comprises sealing means to prevent deterioration of viewing quality of the apparatus due to contamination and may additionally comprise means for lighting the annunciator regions integrally mounted therein.

The novel features of this invention are pointed out with particularity in the claims appended hereto. The invention itself, however, may best be understood by reference to the following detailed description when read in conjunction with the accompanying drawings in which:

DETAILED DESCRIPTION OF THE DRAWINGS

Figure 1:
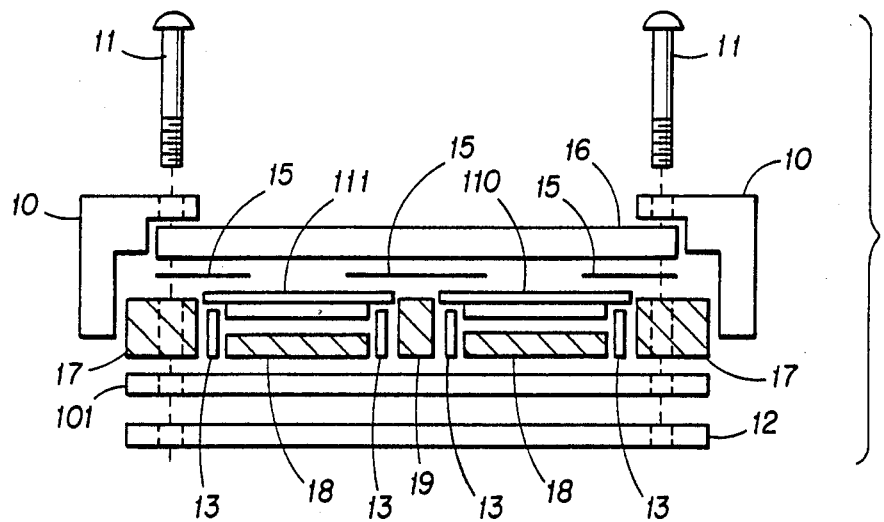
FIG. 1 is an expanded side view of a liquid crystal display apparatus incorporating the present invention wherein each of the respective components of the apparatus are the proper relative positions.

Referring now to FIG. 1, a slightly expanded side view of a liquid crystal display assembly is shown wherein liquid crystals 111 and 110 are positioned closely together in a parallel configuration with elastomeric connectors 13 positioned to contact back portions of crystals 111 and 110.

An elastomeric connector as utilized in this specification has a compressible form, normally rectangular in cross section, with a plurality of spaced parallel conductive regions formed therein. These connectors are commercially available in different shapes and having varied interspaced distances between conductive regions normally constructed to specifically match the electrical contact pattern of a certain crystal or family of liquid crystal displays. These connectors are generically known in the art as "zebra connectors" due to their striated appearance.

Printed circuit board 101 is configured to match the electrical contact regions of the displays as is known in the art. Mask 15 is configured to contact regions of the liquid crystals correctly over the elastomeric connectors 13 and is furthermore voided over those regions of the crystals utilized for annunciation. The cover glass 16 is positioned directly in contact with mask 15 and is held in position by edge clamps 10 and threaded fasteners 11 which are threaded into the backing plate member 12. Alternative fastening means such as adhesives or rivets are known in the art and are also useful. Spacers 17 are configured to receive fasteners 11 and prevent excessive clamping pressure from distorting the assembly. Spacer 19 is positioned to maintain the proper relational positions of crystals 111 and 110 both to one another and to the rest of the assembly.

In this embodiment, electroluminescent lighting panels 18 are additionally included to provide integral lighting to the structure during periods of low or dim ambient light.

It can be seen from the structure shown in FIG. 1 that a cover glass 16 formed of a thin transparent material will have a tendency to bow outward from the assembly in the central region, thereby reducing the effective electrical contact of the elastomeric connectors 13 in the central region. By utilizing mask 15, the pressure on the glass is limited to regions in direct contact with the liquid crystals above the electrical connection regions and a tendency to bow outward is reduced. Alternatively, the edges of mask 15 closest to the fasteners 11 may be thinned or the central region over spacer 19 may be thickened to compensate for the flexural characteristic inherent in glass and transparent plastic sheets.

Figure 2:
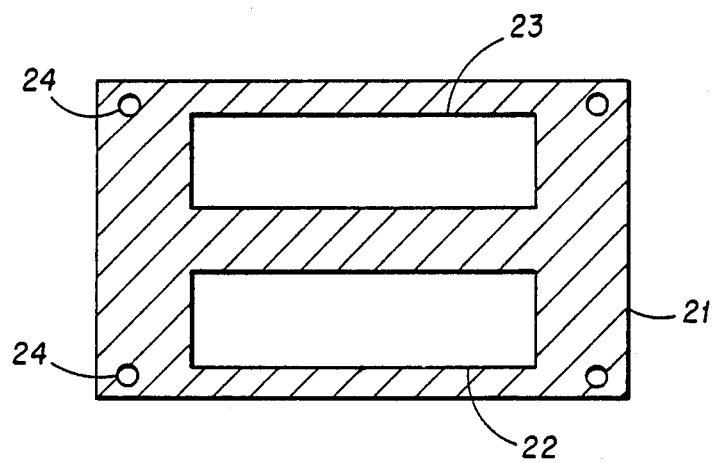
FIG. 2 is a frontal view of a mask in accordance with the present invention as utilized in the embodiment shown in FIG. 1.

Referring now to FIG. 2, mask 21 is shown having holes 24 permitting fastening of the structure as well as the annunciator void 23 for one of the liquid crystals and void 22 for the second liquid crystal as is shown in FIG. 1. Mask 21 significantly improves the reliability of contacts in the central region of the display between the liquid crystals and furthermore provides a more uniform pressure requirement throughout the liquid crystal display assembly while simultaneously allowing reduced material weight in that the cover glass may be thinner since absolute rigidity is no longer required.

It can be seen that in liquid crystal displays utilizing three, four or more discrete liquid crystals in a single panel, the significant advantage of improved electrical contact is attained by utilizing the present invention. Futhermore, since smaller discrete crystals are possible utilizing the present invention, the cost is significantly reduced since four commercially available liquid crystals cost less than a custom crystal having four displays constructed thereon, while providing essentially the same quality of viewing capability. Additionally, should one of the commercially available crystals in a four crystal display fail, the single unit may be replaced at significantly reduced cost as compared to having to replace a custom made four display single crystal. Futhermore, the improved electrical contact and weight savings are obtained without restricting the viewing angle of the display.

The thickness of the mask is varied in alternative embodiments and in displays having three or more crystals, the thickness is modified to apply the pressure required as a function of the flexure characteristic of the cover glass and mounting structure and the distance from the electrical contact region of a liquid crystal in contact with the mask to the edge mounting means.

While this invention has been described with reference to various illustrative embodiments, it is not intended that this description be construed in a limiting sense. Various modifications of the illustrative embodiments as well as other embodiments of the invention will be apparent to persons skilled in the art upon reference to this description. It is therefore contemplated that the appended claims will cover any such modifications of embodiments as fall within the true scope of the invention.

What is claimed is:

1. A liquid crystal display apparatus comprising:
   a. a plurality of liquid crystal displays disposed in a proximal coplanar configuration, each display having an annunciator region on a viewing surface thereof and a plurality of electrical contacts on a surface opposite said viewing surface;
   b. a mask in contact with said viewing surfaces in regions opposite said electrical contacts and voided in regions corresponding to said annunciator regions;
   c. a printed circuit board providing structural support for said apparatus and electrical communication thereto disposed in a parallel relationship with said liquid crystal displays;
   d. a plurality of elastomeric connectors intermediate said printed circuit board and said liquid crystal displays providing electrical contact there between; and
   e. a cover window in contact with said mask on a surface thereof opposite said liquid crystal displays and further having securing means for rigidly attaching said liquid crystal displays, elastomeric connectors, and mask to said printed circuit board.

2. An apparatus as in claim 1 further comprising sealing means for preventing deterioration of viewing quality of said apparatus due to contamination.

3. An apparatus as in claim 1 further comprising means for lighting said annunciator regions.

* * * * *